June 12, 1928.
W. F. CLARK
1,673,395
GLUE POT
Filed April 2, 1921
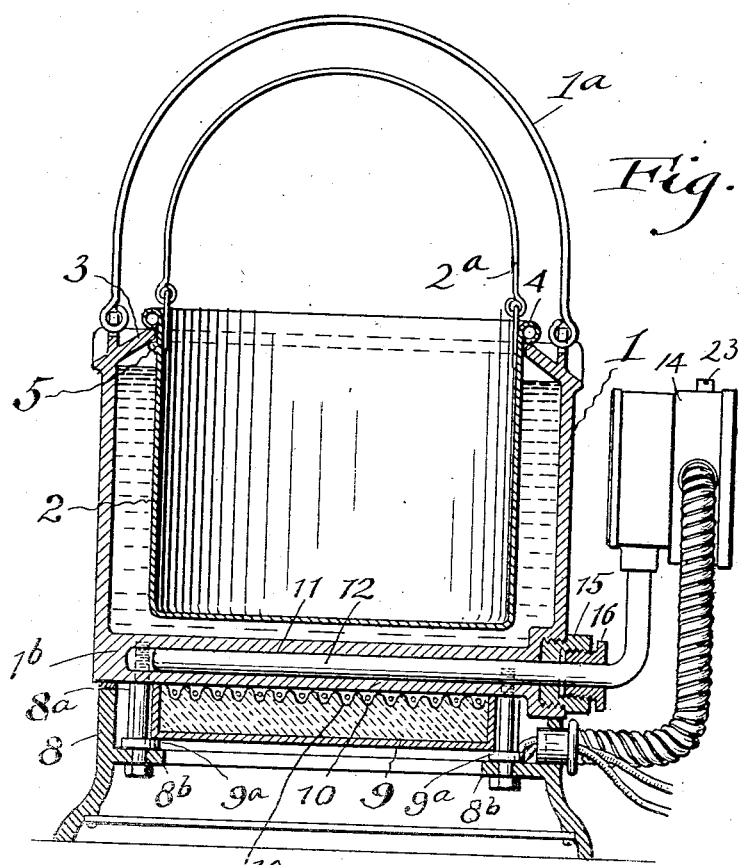
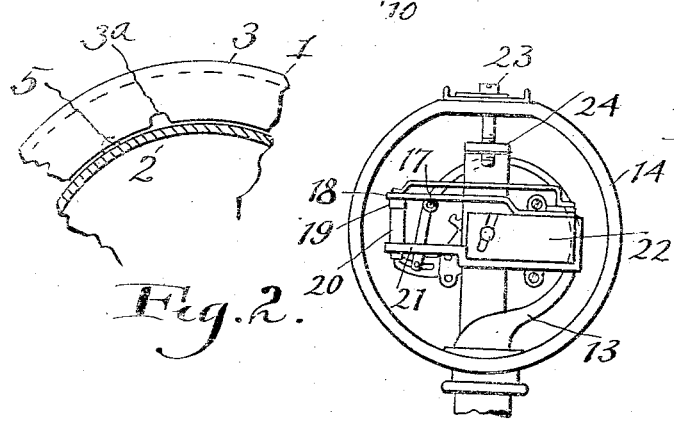
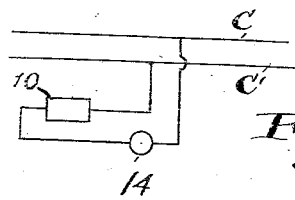
Inventor
Warren F. Clark
by
Thurston, Kwis & Hudson
attys.

Patented June 12, 1928.

1,673,395

UNITED STATES PATENT OFFICE.

WARREN F. CLARK, OF WARREN, PENNSYLVANIA, ASSIGNOR TO AUTOMATIC ELECTRIC HEATER COMPANY, OF WARREN, PENNSYLVANIA, A CORPORATION OF DELAWARE.

GLUE POT.

Application filed April 2, 1921. Serial No. 458,064.

The present invention relates to a construction in which a vessel containing material which it is desired to maintain at a constant temperature, may be so maintained by an electrically energized heater which is in turn controlled in the functioning by the temperature condition of the contents of the vessel.

Among the uses to which the invention may be put and in which it may be embodied, is that of an electricaly heated glue pot, it being a highly desirable thing to be able to maintain the glue at a definite predetermined temperature in order that its viscosity may be constant at all times.

Reference should be had to the accompanying drawings forming a part of this specification in which Fig. 1 is a sectional elevation; Fig. 2 is a fragmentary longitudinal section illustrating a detail of construction; Fig. 3 represents a control device which is used in connection with the heating element of the glue pot; Fig. 4 is a diagram representing the electrical connection.

Referring to the drawings, 1 indicates the outer vessel which is adapted to contain water or another liquid. Within the vessel 1 is a container 2 which is adapted to contain the material or substance which is to be heated. At the upper end of the receptacle or pot 1 is an inwardly extending flange such as indicated at 3 and the upper edge of the receptacle 2 is provided with an extension which in the present instance is a rolled bead 4 which rests upon the flange 3 and so supports the receptacle 2.

Provision is made so as to prevent floating of the receptacle 2 because of its immersion in the water within the vessel 1. This provision consists in providing one or more projections or lugs 5 in the body of the receptacle 2 which may extend beneath the flange 3, thus holding the bead 4 against the flange. In order to enable the projection 5 to pass the flange 3 when the receptacle 2 is introduced into the vessel 1, the flange 3 is provided with one or more suitably spaced recesses or indents such as indicated at $3^a$ and after the projection has been moved through the recess $3^a$ the receptacle 2 is partially turned so as to bring the projection 5 beneath the flange 3.

Both the vessel 1 and the receptacle 2 may be provided with suitable bails $1^a$ and $2^a$.

The vessel 1 is supported upon a base or standard 8 which at its top portion receives an asbestos strip $8^a$ thereby to prevent radiation of heat to the base.

Extending inwardly from the base are a plurality of lugs $8^b$ which support a receptacle 9 and the same is retained by bolts which pass through openings in the lugs and enter threaded openings in the base $1^b$. By this construction the receptacle 9 and the base 8 are secured to the vessel 1.

Washers of asbestos or similar material as indicated at $9^a$ surround the bolts and engage the underside of the receptacle 9 thereby preventing contact radiation of heat from the receptacle 9 to the base.

Within the receptacle 9 is a suitable electric heating element 10, which may be of any desired construction. The heat is thus applied directly to the bottom of the vessel 1 and conducted to the water in the vessel 1.

The bottom member $1^b$ of the vessel 1 is provided with a recess which is substantially midway between the outer and inner surface of the bottom member. This recess 11 extends substantially transversely of the heating element 10 and is substantially centrally arranged with respect to the heating element. Extending into this opening 11 is a tube 12 which at its inner end is sealed or closed, and the tube at its outer end is secured to the end of a Bourdon tube 13, which Bourdon tube is suitably housed in a casing 14. The tube 12 is suitably retained by means of a bushing and nut such as indicated at 15 and 16 respectively.

This tube 12 contains a suitable volatile liquid so as to create pressure conditions within the tube 12 as the tube is heated, all of which is well known and forms no part of this invention. However, it will be noted that the tube 12 is positioned between the heating element and the water within the vessel 1, hence, the heat given off by the heating element affects the tube 12 before the heat is delivered to the water, therefore the temperature of the water can never build up beyond the desired degree so long as the pressure responsive parts connected with the tube 12 are functioning properly.

As before stated, the tube 12 communicates with a Bourdon tube 13 which is housed within a casing 14. This Bourdon tube at its free end is provided with an arm or pin 17 which is in position to engage with a flexible member 18 carrying a contact 19.

Cooperating with the contact 19 is a contact 20 which is mounted upon a supporting member 21. Both the flexible supporting member 18 and the supporting member 21 are mounted upon a block 22 which is of insulating material and is adjustably mounted so that the position of the member 18 with respect to the pin 17 may be adjusted. This adjustment is secured by raising or lowering the block 22 which is accomplished by turning a screw 23 which extends upon the outside of a casing 14, which screw supports and may move a bracket 24 which carries the block 22.

It will be obvious that when the Bourdon tube 13 expands a sufficient amount, the contacts 19 and 20 will be separated, thus breaking circuit of which the contacts 19 and 20 are a part, and conversely upon the retraction of the Bourdon tube in sufficient amount will permit the contacts 19 and 20 to come together again.

The particular electric circuit for supplying electric energy to the heating element 10 may be varied but a simple form is shown in Fig. 4 which will suffice where the current required is not so heavy. In this diagram C and C' represent the main circuit from which electric current is supplied, while the part marked 14 may generally represent the pressure controlled make and break device such as shown in Fig. 3 and the element marked 10 the heating device.

The particular make and break device which is shown and described as well as the electric circuit described, are but illustrative and recourse to other means and ways of accomplishing the same result may be had without departing from the spirit of the invention.

Having described my invention, I claim:

1. In combination, a receptacle adapted to contain a liquid which is to be maintained at substantially constant temperature, said receptacle having a bottom portion, a recess formed in said bottom portion and extending transversely thereof, a heating element supported directly beneath the said bottom portion, a temperature responsive means occupying the recess formed in the bottom portion, said temperature responsive means including a movable element and controlling means for controlling the functioning of the heating element which in turn is controlled by the movable member of the temperature responsive means.

2. In combination, a receptacle adapted to contain a liquid which is to be maintained at substantially constant temperature, and provided with a bottom portion, a recess formed in said bottom portion between the surfaces of said bottom portion and extending transversely of the bottom portion, a temperature responsive member occupying said recess and including a movable element, a heating device mounted directly beneath the bottom portion, means controlling the functioning of the heating device and operative connections whereby the movable element of the temperature responsive member controls the functioning of the heating element.

3. In combination, a receptacle adapted to hold a liquid which is to be maintained at substantially constant temperature having a bottom portion, a recess formed in said bottom portion and extending transversely thereof, a temperature responsive device in part occupying said recess, said temperature responsive device including a movable element, an electric heating element mounted directly beneath the said bottom portion, a make and break device controlling the functioning of the heating element, the make and break device being controlled by the movable element of the temperature responsive device.

4. In combination, a receptacle adapted to contain a liquid which is to be maintained at substantially constant temperature and having a bottom portion, a recess in said bottom portion and lying between the top and bottom surfaces thereof, said recess extending transversely of the said bottom portion, a temperature responsive device, a portion of which occupies said recess, said temperature responsive device including a movable member, an electric heating element mounted beneath and substantially against the underside of said bottom portion, a make and break device controlling the functioning of the electric heating element, the movable member of the temperature responsive device controlling the functioning of the make and break device.

5. In combination, a receptacle adapted to contain a liquid which is to be maintained at substantially constant temperature and having a bottom portion, a recess formed in said bottom portion and extending transversely thereof, a temperature responsive device, a portion of which occupies said recess, said temperature responsive device including a movable member, retaining means extending from the under surface of the said bottom portion, a heating element substantially in contact with the underside of the said bottom portion, members cooperating with said retaining means and with the heating element to support the same, a make and break device for controlling the function of the said heating element, the said movable member of the temperature responsive device controlling the functioning of the make and break device.

In testimony whereof, I hereunto affix my signature.

WARREN F. CLARK.